Patented Jan. 26, 1954

2,667,520

UNITED STATES PATENT OFFICE 2,667,520

POLYMERIZATION OF ACETYLENE TO OPEN CHAIN POLYMERS WITH NICKEL COORDINATION COMPOUND CATALYSTS

Elbert C. Herrick, Boothwyn, Pa., and John C. Sauer, Wilmington, Del., assignors to E. I. du Pont de Nemours & Company, Wilmington, Del., a corporation of Delaware No Drawing. Application December 4, 1952,
Serial No. 324,138

14 Claims. (Cl. 260—678)

This invention relates to a new process of synthesizing open-chain acetylene polymers. More particularly this invention relates to a new process for synthesizing monovinylacetylene from acetylene.

Monovinylacetylene is prepared industrially by polymerization of acetylene in a solution of cuprous chloride and ammonium chloride in hydrochloric acid. Because of the great technical importance of monovinylacetylene, new methods of synthesizing it in satisfactory yields are constantly being sought.

It is an object of this invention to provide a new process for synthesizing open-chain acetylene polymers. It is a further object of this invention to provide a new process for synthesizing monovinylacetylene from acetylene. Another object is to provide a new catalytic process for synthesizing monovinylacetylene from acetylene at atmospheric pressure. Other objects will appear hereinafter.

These objects are accomplished by the following invention of a process of synthesizing open-chain acetylene polymers which comprises continuously introducing acetylene at a temperature above about 50° C. into a solution of a catalyst in a heterocyclic amine of ionization constant between $1 \times 10^{-3}$ and $1 \times 10^{-11}$ and in which the amino nitrogen is part of the heterocyclic nucleus, said catalyst being the nickel salt of the enol form of a 1,3-dicarbonyl compound containing at most one aromatic group, and separating monovinylacetylene from the reaction products.

The product of this reaction is preponderantly monovinylacetylene, accompanied by much smaller amounts of other open-chain acetylene polymers, i. e., open-chain compounds of the formula $(C_2H_2)_x$, such as divinylacetylene or its isomer 1,3-hexadiene-5-yne, and still smaller amounts of higher polymers.

The catalysts which bring about the polymerization of acetylene in the process of this invention are the nickel coordination compounds, or complexes, of certain 1,3-dicarbonyl compounds, e. g., the nickel "enolates" of beta-ketoesters, beta-ketoaldehydes and 1,3-diketones containing at most one aromatic group. It is well known that compounds containing a 1,3-dicarbonyl structure

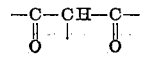

in the enol form, i. e., containing the skeleton

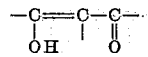

form metal complexes which are viewed as metallic "salts" of the enol form. These metal complexes, including the nickel complexes which are of specific use in this invention, are well known compounds and have been described in the literature. The nickel salts suitable for this process are those derived from the enol form of 1,3-dicarbonyl compounds containing at most only one aromatic group since it has been found that those having more than one aromatic group, e. g., dibenzoylmethane, are substantially ineffective. The nickel complexes are specific catalysts in this reaction. Similar complexes with cobalt, copper and manganese are ineffective.

The above catalysts are used in a solution in a heterocyclic amine where the amino nitrogen is intracyclic, i. e., a secondary or tertiary amine in which the amino nitrogen is part of a heterocyclic nucleus. To be effective, the heterocyclic amine should be one of ionization constant between about $1 \times 10^{-3}$ and about $1 \times 10^{-11}$.

The ratio of acetylene to the catalytic mass (nickel complex and heterocyclic amine) is not highly critical. This ratio is best expressed in terms of space velocity (parts of acetylene contacted with one part of catalyst mass per hour) and this can vary between wide limits, e. g., between 0.01 and 10 or more. In general, relatively low space velocities, in the range of 0.1 to 10 are preferred. The amount of heterocyclic amine is not critical, provided there is enough to provide a liquid phase at all times and to maintain at least part of the nickel enolate in solution. In general, the catalyst is present in the solution at concentrations between 0.1 and 20% by weight, depending in part on the solubility of the particular nickel complex in the particular heterocyclic amine.

The reaction is impractically slow at temperatures below about 50° C., and higher temperatures are therefore desirable. Temperatures between 50° C. and the boiling point of the heterocyclic amine at the operating pressure are satisfactory, a generally useful range being 65–125° C.

The reaction takes place readily at atmospheric pressure, and this is a great advantage as it is of course more convenient and economical to operate with acetylene at atmospheric or relatively low pressures. However, elevated pressures can be used, for example, in the range of 10–40 lb./sq. in. or even up to 200 lb./sq. in. if desired, which pressures can be produced by acetylene alone or by an added inert gas such as nitrogen or by a mixture of both. A continuous flow reactor is preferably employed but different modes of operating can be used, such as operations in autoclaves.

The monovinylacetylene produced can be separated from the other reaction products and unchanged acetylene by low temperature, atmospheric pressure distillation or by superatmospheric pressure distillation or by any other convenient method. As in other methods of synthesizing monovinylacetylene from acetylene, the conversions are not very high, of the order of 5 to 8%, but this is no disadvantage since the unused acetylene can readily be recycled. The yields, however, are satisfactory since they approach 50% with the more active nickel complex catalysts.

This invention is further illustrated in greater detail, but not limited, by the following examples, in which the parts are by weight unless otherwise specified.

EXAMPLE I

A reaction vessel was provided with a gas inlet tube, extending close to the bottom of the vessel, and a condenser fitted with a gas exit tube leading to a receiver cooled in a Dewar flask containing solid carbon dioxide and acetone. Air was displaced from the system by a stream of nitrogen. Five parts of nickel ethyl acetoacetate, prepared as described hereinafter, and 196 parts of pyridine (distilled from barium oxide) were added to the reaction vessel which was heated to 78° C. by a vapor bath containing refluxing ethyl alcohol. Acetylene, which had been passed through gas scrubbers containing water, silver salt solution (Fieser's solution; J. Am. Chem. Soc. 46, 2639 (1924)), concentrated sulfuric acid, pelleted sodium hydroxide and 4–8 mesh activated alumina, was passed continuously through the reaction mixture at a space velocity of 0.23 part per part of reaction mixture per hour.

The monovinylacetylene collected in the receiver, after redistillation, amounted to 0.97 part per hour. The yield of monovinylacetylene was 29% of the theory, based on the unrecovered acetylene. Monovinylacetylene was identified by boiling point, by infra-red absorption measurements, and by the formation of the brilliant yellow copper monovinylacetylide through reaction with ammoniacal cuprous chloride. Small amounts of a mixture of divinylacetylene and 1,3-hexadiene-5-yne were isolated by distillation of the reaction product in the receiver and identified by infra-red absorption measurements. The residue from the distillation of the reaction mixture was composed of viscous liquid and solid polymers of acetylene.

EXAMPLE II

Example I was repeated except that 1 part of nickel ethyl acetoacetate was added to 196 parts of pyridine and acetylene was passed through the mixture at a space velocity of 0.19 part per part of reaction mixture. Monovinylacetylene was synthesized at the rate of 0.89 part per hour. The yield was 46% of the theoretical, based on the unrecovered acetylene.

EXAMPLE III

Example I was repeated except that the reaction mixture, consisting of 10 parts of nickel ethyl acetoacetate and 392 parts of pyridine, was maintained at 65° C. while acetylene was passed through the mixture at a space velocity of 0.13 part per part of reaction mixture per hour. The yield of monovinylacetylene amounted to 0.52 part per hour, 39% of the theoretical.

EXAMPLE IV

Example III was repeated except that the reaction mixture was maintained at about the boiling point of pyridine by a vapor bath at 124° C., and acetylene was passed through the mixture at a space velocity of 0.12 part per part of reaction mixture. The yield of monovinylacetylene amounted to 0.82 part per hour, 37% of the theoretical.

EXAMPLE V

A 1-liter autoclave, stirred from the bottom, was fitted wtih a drop-leg to deliver acetylene below the liquid surface. Acetylene, from a storage tank at 200 lb./sq. in. pressure, containing less than 10 p. p. m. of oxygen, was passed through scrubbers containing calcium chloride, activated alumina and sodium hydroxide. The flow of acetylene to the autoclave was controlled by two manually adjusted needle valves and metered by a rotameter. The autoclave pressure was maintained at 40 lb./sq. in. by a manually adjusted needle valve in the exit gas line. The off-gas was passed through several receivers in series cooled by solid carbon dioxide and acetone.

The autoclave was charged with 12.5 parts of nickel ethyl acetoacetate and 246 parts of pyridine. Air was displaced from the system by a stream of nitrogen and the reactor was heated to 65° C. and pressured to 40 lb./sq. in. with acetylene. The reactor was stirred and acetylene was admitted continuously at a rate such that the space velocity of the off-gas was 0.02 part of acetylene per part of reaction mixture per hour. Monovinylacetylene was synthesized at the rate of 0.43 part per hour.

A series of experiments were carried out under the reaction conditions of Example I, except that in each case the pyridine was replaced by another heterocyclic amine. Nickel ethyl acetoacetate was the catalyst in all cases. These examples are summarized in Table I below. The yields of monovinylacetylene ranged from 5 to 33% of the theoretical.

*Table I*

| Example | Reaction medium | Amount of catalyst, parts | Parts of monovinyl-acetylene per hour |
|---|---|---|---|
| VI | Beta-picoline, 192 parts | 5 | 0.71 |
| VII | Alpha-picoline, 380 parts | 10 | 0.36 |
| VIII | 2-methyl-5-ethyl pyridine, 200 parts | 10 | 0.16 |
| IX | Piperidine, 172 parts | 5 | 0.07 |
| X | Quinoline, 219 parts | 10 | 0.06 |

Another series of experiments were carried out under the reaction conditions of Example I, except that in each case the nickel ethyl acetoacetate was replaced by another nickel complex of a 1,3-dicarbonyl compound as above defined. In all cases, the reaction medium was 196 parts of pyridine. These examples are summarized in Table II below. The yields of monovinylacetylene ranged from 14 to 40% of the theoretical.

*Table II*

| Example | Catalyst | Parts of monovinyl-acetylene per hour |
|---|---|---|
| XI | Ni o-hydroxyacetophenone, 5 parts | 0.50 |
| XII | Ni ethyl salicylate, 5 parts | 0.73 |
| XIII | Ni ethyl acetonedicarboxylate, 5 parts | 0.34 |
| XIV | Ni phenyl acetoacetate, 5 parts | 0.43 |
| XV | Ni ethyl benzoylacetate, 5 parts | 0.45 |
| XVI | Ni benzoylacetone, 5 parts | 0.21 |
| XVII | Ni salicylaldehyde, 10 parts | 0.05 |
| XVIII | Ni acetylacetone, 10 parts | 0.05 |
| XIX | Ni pyridinium ethyl acetoacetate, 10 parts | 0.05 |

The nickel ethyl acetoacetate used in some of the above examples was prepared in the following manner: Nickel nitrate, Ni(NO₃)₂.6H₂O (0.1 mole, 29.08 g.) was dissolved in 50 ml. of distilled water and added to ethyl acetoacetate (0.2 mole, 26.03 g.) which was dissolved in 20 ml. of ether. Sodium hydroxide (0.2 mole, 8.0 g.) dissolved in 25 ml. of distilled water, was added with stirring. An immediate green precipitate formed. An additional 100 ml. of distilled water was added and the mixture was stirred about an hour. The mixture was filtered and the solid was washed on a filter several times with water. The precipitate was finally washed with 25 ml. of acetone and dried on the filter. The precipitate was placed in a vacuum oven and dried four hours at 65° C. and 20 mm. The dried precipitate weighed 26.2 g. and had the following analysis.

Anal.—Calc'd for Ni(C₆H₉O₃)₂: C, 42.50; H, 5.65; Ni 20.80. Found: C, 42.17, 41.99; H, 5.72, 5.69; Ni, 20.65, 20.68.

The above procedure is a modification of that described by Wislicenus, Ber., 35, 546 (1902).

The preparations of the other nickel complexes of the examples were in general similar to the preparation of nickel ethyl acetoacetate as described above, except for nickel pyridinium ethyl acetoacetate which was prepared by a modification of the procedure described for nickel pyridinium acetylacetone by Biltz and Clinch in Z. anorg. chem. 40, 223 (1904).

A number of nickel enolates of 1,3-dicarbonyl compounds have been shown in the examples. Other suitable catalysts include the nickel enolates of such compounds as methyl acetoacetate, ethyl (alpha-methyl) acetoacetate, ethyl (alpha-n-butyl) acetoacetate, ethyl (alpha-phenyl) acetoacetate, methyl (alpha-benzyl) acetoacetate, and other acetoacetic esters, ethyl 3,5-diketopimelate, 2-carbethoxycyclopentane-1-one, 2-carbethoxycyclohexane-1-one, methyl benzoylacetoacetate, n-butyl salicylate, ethyl p-methyl salicylate, ethyl 6-hydroxy-2,4-dimethylbenzoate, malondialdehyde, butanone-3-al-1, 2-formylcyclopentane-1-one, 2-formylcyclohexane-1-one, p-ethyl salicylaldehyde, 3-methyl-2,4-diketopentane, 3-ethyl-2,4-diketopentane, 3-benzyl-2,4-diketopentane, 2-acetylcyclopentane-1-one, 2-acetylcyclohexane-1-one, 5,5-dimethylcyclohexane-1,3-dione, o-hydroxy-p-methylacetophenone, o-hydroxybutyrophenone, and the like.

As has been shown (Example XIX) there can be used, instead of the nickel enolates, their complexes with organic nitrogen bases such as pyridine, although there is no particular advantage in doing so. For reasons of accessibility and stability, the preferred 1,3-dicarbonyl compounds are those which contain only carbon and hydrogen besides the keto oxygens, and which are aliphatically saturated except for the enol double bonds. The most accessible of such compounds are those which contain a total of between 5 and 12 carbon atoms.

The preferred catalysts are those of the following more specific classes:

(1) Nickel salts of substituted 3-keto-1-propene-1-ols, i. e., having the 3-keto-1-propene-1-ol structure,

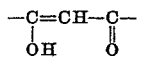

which can be represented by the general formula

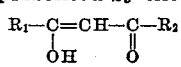

wherein R₁ and R₂ are hydrogen, hydrocarbon, such as phenyl or alkyl, preferably a lower alkyl of 1 to 4 carbon atoms, hydrocarbon ether, such as phenoxy or alkoxy, preferably of 1 to 4 carbon atoms, or an alkoxycarbomethylene group, i. e., —CH₂COOR wherein R is alkyl, preferably of 1 to 2 carbon atoms, and not more than one of R₁ and R₂ being an aromatic radical.

(2) Nickel salts of substituted o-ketophenols (the enol forms of 1,3-dicarbonyl compounds) of the formula

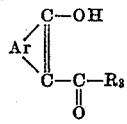

wherein R₃ is hydrogen, alkyl, preferably of 1 to 4 carbon atoms, or alkoxy, preferably of 1 to 4 carbon atoms and Ar is a divalent hydrocarbon radical, which together with the other two carbon atoms to which it is joined forms a phenyl or alkyl substituted phenyl radical, said alkyl substituent being preferably of 1 to 2 carbon atoms.

Other heterocyclic amines having ionization constants between $1 \times 10^{-3}$ and $1 \times 10^{-11}$ and suitable for dissolving the nickel coordination complex include gammapicoline, 2,4-dimethylpyridine, 2,6-dimethylpyridine, 2,4,6-trimethylpyridine, 2-methylpiperidine, morpholine, piperazine, 2-methylquinoline, 4-methylquinoline, 6-methylquinoline, isoquinoline, alpha-methyl-N-methylpyrrolidine, pyrrolidine, alpha-ethylpyrroline, alpha-benzylpyrroline, and the like. The most economical and therefore preferred of such heterocyclic amines are those which contain only carbon and hydrogen in addition to the amino nitrogen, are aliphatically saturated, contain a heterocyclic nucleus of 5 to 6 atoms and have a total of from 5 to 11 carbon atoms.

This invention provides a convenient and satisfactory method of synthesizing monovinylacetylene from acetylene. As is known, monovinylacetylene is an industrially important chemical, its principal use being a starting material in the manufacture of the synthetic elastomers obtained by polymerization of 2-chloro-1,3-butadiene.

As many apparently widely different embodiments of this invention may be made without departing from the spirit and scope thereof, it is to be understood that this invention is not limited to the specific embodiments thereof except as defined in the appended claims.

We claim:

1. Process of synthesizing open-chain acetylene polymers which comprises continuously introducing acetylene at a temperature above about 50° C. into a solution of a catalyst in a heterocyclic amine of ionization constant between $1 \times 10^{-3}$ and $1 \times 10^{-11}$ and in which the amino nitrogen is part of the heterocyclic nucleus, said catalyst being the nickel salt of the enol form of a 1,3-dicarbonyl compound containing at most one aromatic group, and separating monovinylacetylene from the reaction products.

2. Process of synthesizing open-chain acetylene polymers which comprises continuously introducing acetylene at a temperature above about 50° C. into a solution of the nickel salt of the enol form of an acetoacetic ester in a heterocyclic amine of ionization constant between $1 \times 10^{-3}$ and $1 \times 10^{-11}$ in which the amino nitrogen is part of the heterocyclic nucleus, and separating monovinylacetylene from the reaction products.

3. Process of synthesizing open-chain acetylene polymers which comprises continuously introducing acetylene at a temperature above about 50° C. into a solution of a catalyst in pyridine, said catalyst being the nickel salt of the enol form of a 1,3-dicarbonyl compound containing at most one aromatic group, and separating monovinylacetylene from the reaction products.

4. Process of synthesizing open-chain acetylene polymers which comprises continuously introducing acetylene at a temperature above about 50° C. into a solution of the nickel salt of the enol form of an acetoacetic ester in pyridine, and separating monovinylacetylene from the reaction products.

5. Process of synthesizing open-chain acetylene polymers as set forth in claim 1 wherein said catalyst is nickel o-hydroxyacetophenone.

6. Process of synthesizing open-chain acetylene polymers as set forth in claim 1 wherein said catalyst is nickel ethyl salicylate.

7. Process of synthesizing open-chain acetylene polymers as set forth in claim 1 wherein said catalyst is nickel ethyl acetonedicarboxylate.

8. Process of synthesizing open-chain acetylene polymers as set forth in claim 2 wherein said nickel salt of the enol form of an acetoacetic ester is nickel ethyl acetoacetate.

9. Process of synthesizing open-chain acetylene polymers as set forth in claim 2 wherein said nickel salt of the enol form of an acetoacetic ester is nickel phenyl acetoacetate.

10. Process of synthesizing open-chain acetylene polymers as set forth in claim 3 wherein said catalyst is nickel o-hydroxyacetophenone.

11. Process of synthesizing open-chain acetylene polymers as set forth in claim 3 wherein said catalyst is nickel ethyl salicylate.

12. Process of synthesizing open-chain acetylene polymers as set forth in claim 3 wherein said catalyst is nickel ethyl acetonedicarboxylate.

13. Process of synthesizing open-chain acetylene polymers as set forth in claim 4 wherein said nickel salt of the enol form of an acetoacetic ester is nickel ethyl acetoacetate.

14. Process of synthesizing open-chain acetylene polymers as set forth in claim 4 wherein said nickel salt of the enol form of an acetoacetic ester is nickel phenyl acetoacetate.

ELBERT C. HERRICK.
JOHN C. SAUER.

No references cited.